US 6,649,207 B2

(12) United States Patent
Coote et al.

(10) Patent No.: US 6,649,207 B2
(45) Date of Patent: Nov. 18, 2003

(54) COMPOSITION SUITABLE FOR PREPARING AN OIL IN WATER EMULSION

(75) Inventors: Elisabeth Coote, Fife (GB); Donald Bernard Farrer, Sharnbrook (GB); Roger Morley Finlayson, Vlaardingen (NL); Timothy John Foster, Sharnbrook (GB); Alison Louise Russell, Sharnbrook (GB)

(73) Assignee: Lipton, division of Conopco, Inc., Englewood, NJ (US)

(*) Notice: Subject to any disclaimer, the term of this patent is extended or adjusted under 35 U.S.C. 154(b) by 150 days.

(21) Appl. No.: 09/884,389

(22) Filed: Jun. 19, 2001

(65) Prior Publication Data

US 2002/0044999 A1 Apr. 18, 2002

(30) Foreign Application Priority Data

Jun. 26, 2000 (EP) .............................. 00305381

(51) Int. Cl.⁷ ................................. A23D 9/00
(52) U.S. Cl. ................. 426/602; 426/580; 426/583; 426/599
(58) Field of Search ................ 426/601, 602, 426/603, 604, 580, 599, 583

(56) References Cited

U.S. PATENT DOCUMENTS 4,160,850 A * 7/1979 Hallstrom et al. .......... 426/601
5,547,513 A * 8/1996 Mallee et al. .................. 127/38
5,584,937 A * 12/1996 Finocchiaro .................. 127/38
5,676,994 A * 10/1997 Eskins et al. ................ 426/602
5,690,981 A * 11/1997 Watanabe et al. ........... 426/531
5,935,633 A * 8/1999 Derian ........................ 426/582
6,447,831 B1 * 9/2002 Daniels et al. .............. 426/604
6,468,578 B1 * 10/2002 Bodor et al. ................ 426/603

FOREIGN PATENT DOCUMENTS

| EP | 0239378 | * | 3/1986 |
| EP | 0 441 494 | | 8/1991 |
| GB | 1417952 | * | 5/1974 |
| WO | 96/29882 | | 10/1996 |
| WO | 96/29894 | | 10/1996 |
| WO | WO97/04660 | * | 2/1997 |
| WO | 98/47386 | | 10/1998 |
| WO | 99/63835 | | 12/1999 |

OTHER PUBLICATIONS

Europe Search Report.

* cited by examiner

*Primary Examiner*—Carolyn Paden
(74) *Attorney, Agent, or Firm*—Milton L. Honig

(57) ABSTRACT

The invention relates to a composition comprising emulsifier, cold hydrating viscosifying agent, and optionally fat and protein, which composition is suitable for use in the preparation of an oil in water emulsion.

9 Claims, 1 Drawing Sheet

COMPOSITION SUITABLE FOR PREPARING AN OIL IN WATER EMULSION

BACKGROUND OF THE INVENTION

1. Field of the Invention

The invention relates to a pourable or pasty composition which is suitable for use in the preparation of an oil in water emulsion.

2. The Related Art

Oil in water emulsions are encountered in many types of uses. Spreadable oil in water emulsions are suitable for use as a table spread. Examples of such spreadable products include fresh cheese and dairy based spreads. Water continuous spreadable products are often milk based and optionally acidified as disclosed for example in WO-A-97/04660, DE-A-37101052, DE-A-3822082, EP-A-938,848 and EP-A-603,890.

Pourable or spoonable oil in water type emulsions are known as spoonable creams, dressings, whippable creams and cooking creams.

However these products are microbiologically unstable products at temperatures above refrigerator temperature and show limited microbiological stability even at storage temperatures around 4° C.

Although the microbiological stability of these products can be extended to several months at refrigeration temperature by addition of preservatives and lowering of the pH to around 4, this still does not provide products which can be distributed at ambient temperature without showing microbiological spoilage and which can be kept in a consumer's house under non-refrigerated conditions.

The storage stability problem of butter substitutes is addressed in U.S. Pat. No. 4,160,850. This document discloses a shelf stable mix which is used by the consumer to prepare a fat continuous, spreadable butter substitute.

The storage stability problem of water continuous food products at non-refrigerated conditions has been addressed in U.S. 5,935,633. This document discloses a dry powdered cheese composition comprising dehydrated cheese powder, a cold swelling starch, a calcium containing agent, one or more salts, flavouring agents and vegetable shortening. This composition may be reconstituted with water to provide a cheese product which has appearance, texture and flavour comparable to a natural cheese.

The dehydrated powder is microbiologically stable for at least 7 months.

It is known to be difficult to mix a powder homogeneously with water because of clump formation and premature swelling of chunks of powder which are closely bound together.

Furthermore EP-A-239,378 discloses hydratable powders which are capable of providing a duplex emulsion upon rehydration in hot water.

The hydratable powders of EP-A-239,378 are again difficult to hydrate homogeneously and provide difficulties if a smooth, homogeneous reconstituted product is desired. Furthermore hot water is required for reconstitution to form an emulsion.

WO-A-96/29894 discloses a fat continuous composition which is suitable for the preparation of sauces by adding water or an aqueous liquid to it and heating the resulting mixture. The fat composition comprises a fat, water dispersible dry milk ingredients, a starch, up to 40 parts by weight of water, and optionally gelatin or a similar hydrocolloid.

It was found that also the products of WO-A-96/29894 require boiling of water before a final product can be prepared, which is costly and can not be carried out at all places.

GB-A-1417952 discloses that a pasty dry cream product can be used to enhance the taste/creaminess of foods when mixed in a 1:13–26 ratio. The pasty dry composition contains fat powders (having a melting range of butterfat), butterfat/animal fat (melting point 40–50° C.)/vegetable fat (melting point about 39° C.), starch and sodium caseinate. The compositions were found to be not dispersible in water at room temperature (20° C.). Elevated temperatures are required for the preparation of a spread which is finally fat continuous. The high levels of starch in the products of GB-A-1417952 were found to lead to final emulsions with an undesired very starchy mouthfeel.

Hence it is an object of the invention to provide a product which can serve as a basis for an oil in water emulsion, but which can be kept more than 3 months at ambient temperature, and which can be formed into an oil in water emulsion by the addition of a water based liquid at a temperature between 5 and 60° C., preferably between 5° C. and ambient temperature, whereby the resulting products are comparable in taste and mouthfeel to a natural oil in water emulsion which is prepared in an industrial process. The claimed compositions are especially suitable for preparing spreadable or spoonable oil in water emulsions.

It is a further object of the invention to provide a composition which besides being suitable for the preparation of an oil in water emulsion, can also be used as such for shallow frying and baking of food stuff.

According to another object of the invention the final oil in water emulsion which is prepared from the fat composition does not show separation into an oil phase and an aqueous phase upon storage for 2 weeks at 28° C.

According to yet another object of the invention, the composition can be easily converted into a final oil in water emulsion, by use of simple, consumer friendly techniques.

SUMMARY OF THE INVENTION

It has surprisingly been found that a pourable or pasty composition comprising a specific ratio of emulsifier, fat blend, and a cold hydrating viscosifying agent and optionally protein, is a suitable base product to form an oil in water emulsion.

The rheology of this emulsion can surprisingly be adjusted by the careful selection of the cold hydrating viscosifying agent.

The final emulsion can be formed by adding to the composition according to the invention a water based liquid which is at a temperature between 5 and 60° C., preferably between 5° C. and ambient temperature, or both a water based liquid and additional oil at said temperature to reach the required oil level in the final emulsion. Mixing of the water based liquid and the composition according to the invention is easily done by shaking or stirring.

Therefore in a first aspect the invention relates to a pourable or pasty essentially water free composition comprising optionally 0–100 parts by weight of a fat or fat blend, 0.01 to 25 parts by weight of an emulsifier, 0.5 to 50 parts by weight of a cold hydrating viscosifying agent, and optionally 0 to 20 parts by weight of a protein.

In further aspects the invention relates to a process for the preparation of this composition, to its use for the preparation of an oil in water emulsion and to a process to prepare an oil in water emulsion and to the emulsion thus prepared.

BRIEF DESCRIPTION OF DRAWING

The sole drawing is FIG. 1 illustrating a Stevens Texture Analyzer grid.

DETAILED DESCRIPTION

Figure 1:
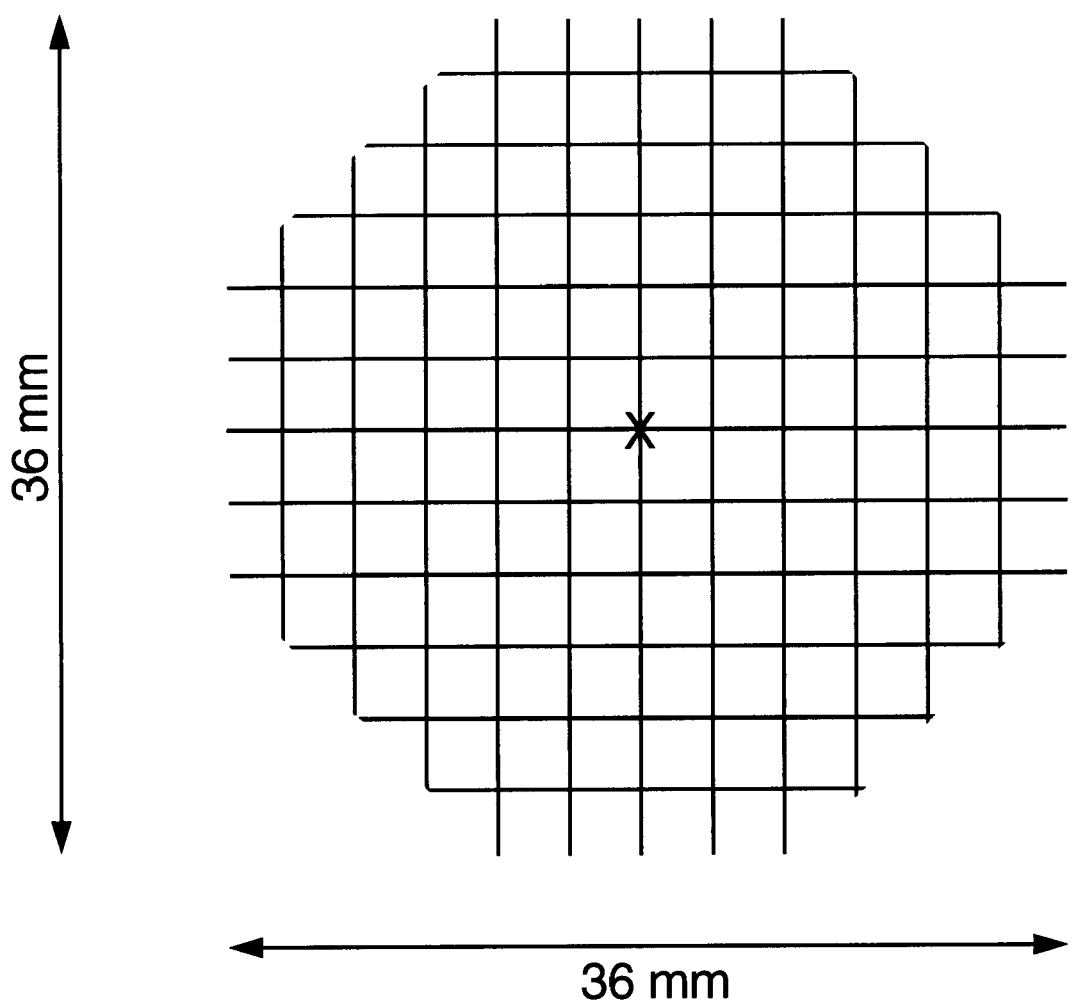

In this specification and claims the percentages used are wt % on total product weight unless otherwise is indicated.

For the purpose of the current invention the term "ambient temperature" refers to temperatures ranging from 5 to 35° C.

For the purpose of the invention the term "final oil in water emulsion" or "final product" refers to the oil in water emulsion which results when the composition according to the invention is mixed with a water based liquid and optionally a further fat or fat blend.

In this specification and claims the terms "fat" and "oil" are used interchangeably.

The invention relates to a composition which is a suitable base for a spreadable, spoonable or pourable oil in water emulsion.

The composition according to the invention has several advantages: it is easily transported and not easily contaminated during storage. Transport is relatively cheap because of the reduced volume compared to the volume occupied during transport of the final emulsion.

A consumer can vary the taste and flavour of the final oil in water emulsion (which is based on the composition according to the invention) according to the specific needs. For example a neutral, bland tasting spread is prepared if water and optionally oil are added. The addition of further ingredients such as flavoured powders as disclosed below leads to products with an attractive flavour impression. Also the fat level can be adapted to the desires of the individual consumer. Moreover the final oil in water emulsion is stable, has good taste properties and is easily prepared.

Spreadable in the context of the invention is defined by a combination of G' and Stevens value wherein the Stevens value, determined by the method illustrated in the examples, is preferably from 40 to 500 g at 5° C. and G', determined by the method illustrated in the examples, preferably ranges from 300 to 5000 Pa at 5° C. under the measuring conditions specified in the examples. More preferred the Stevens value at 5° C. is from 70 to 500 g.

Acceptable spreadable, spoonable or pourable products are defined as showing a tan delta value from 0.05 to 0.7 at a temperature of 20° C. in combination with a strain (critical strain to failure) at tan delta d=1 of from 0.6 to 2.20 determined by the method according to the examples.

In view of both microbiological stability and the potential risk of premature swelling of the cold hydrating viscosifying agent, the composition is essentially water free. Essentially water free for the purpose of the invention is defined as comprising less than 10 wt % water, more preferred less than 8 wt %, most preferred less than 1 wt % water.

The composition according to the invention comprises an emulsifier. This emulsifier can be a single emulsifier or a combination of emulsifiers.

Suitable emulsifiers include, but are not limited to lecithins and polyoxyethylene compositions such as sorbitan monopolyoxyethylene (Tween).

The preferred emulsifier is a lecithin or a combination of several types of lecithin.

Suitable lecithins include for example hydrolysed lecithin such BOLEC MT(™), Sterpur E(™), Adlec E(™); fractionated lecithin such as the alcohol soluble fraction of native lecithins such as Cetinol(™) Nathin 3-KE(™); native lecithin such as Bolec ZT(™), Adlec(™), Sterpur PM(™); and combinations of any of these. Compositions including a hydrolysed lecithin are highly preferred.

The amount of emulsifier is from 0.01 to 25 parts by weight, preferably from 0.1 to 20 parts by weight, more preferably from 0.3 to 10 parts by weight, more preferred from 0.5 to 5 parts by weight. Even more preferred the amount of emulsifier is from 0.5 to 10 wt %, most preferred from 1.5 to 4 wt % on total composition weight. It will be appreciated that the amount of emulsifier depends upon the fat content of the composition according to the current invention.

The composition further comprises a cold hydrating viscosifying ingredient. These ingredients are defined as those ingredients which will hydrate when added to water which is at a temperature of at most 60° C. The hydration leads to an increase of viscosity of the water in which the ingredient is dispersed. A test to determine suitable cold hydrating viscosifying (CHV) ingredients or systems is described in the examples. This test is further referred to as "RVA method".

Those agents or combinations thereof that show a final viscosity after 500 seconds of more than 1700 cP, or that show a final viscosity of from 300 to 600 cP in combination with a rate of hydration defined by the difference of viscosity between time is 0 seconds and time is 100 seconds of more than 1200 cP/minute, are considered suitable cold hydrating viscosifying agents.

Suitable agents can also be found by microscopic examination of water swollen compositions. Suitable compositions for spread-like textures show intact, swollen particles, whereas ones showing irregular, "broken" structures tend to be less suitable.

Compositions that are intended for preparation of a final emulsion that is spreadable should comprise a cold hydrating viscosifying agent that gives a final viscosity of at least 1700 cP, preferably 1700 to 4000 cP in combination with a rate of hydration of at least 600, preferably 600 to 4000 cP/minute determined by the RVA-method according to the examples.

Compositions that are intended for preparation of a final emulsion that is pourable or spoonable preferably comprise a cold hydrating viscosifying agent that gives a final viscosity of from 300 to 600 cP, in combination with a rate of hydration of from 1200 to 2000 cP/minute determined by the RVA-method according to the examples.

Preferably the cold hydrating viscosifying agent is selected from the group comprising cold swelling starch, inulin and gums which give final viscosities greater than 400 cP with hydration rates greater than 1500 cP/min in the RVA method, or combinations thereof.

Especially preferred cold hydrating viscosifying agents are the so called "modified waxy maize starches".

The cold hydrating viscosifying agent is present in the composition according to the invention in an amount of 0.5 to 50 parts by weight, more preferred 1 to 8 parts by weight. Even more preferred the amount is from 2 to 25 wt %, more preferred from 3 to 10 wt % on total product weight. It will be appreciated that the amount of this agent again depends upon the fat content of the composition according to the invention.

One of the advantages of the current composition is its suitability for use in the preparation of a final oil in water emulsion with an adjustable texture. It was found that the texture of the final composition can be modified by varying the specific type of cold hydrating viscosifying agent that is applied.

The following guidelines provide guidance for selection of the cold hydrating viscosifying agent.

For the preparation of spreadable final oil in water emulsions, the use of a cold swelling starch as cold hydrating viscosifying agent is highly preferred. Suitable cold swelling starches are preferably selected from the group comprising Ultratex A™, Ultratex 1™, Ultratex 2™, Ultratex 2000™, Ultratex 3™, Ultratex 4™, Instant Clearjel™, Ultrasperse M™, Ultrasperse 5™, and Ultrasperse A™ and combinations thereof. The mentioned examples are available from National Starch. Remyline AP™ ex Remy Industries is another suitable cold swelling starch.

Modified potato starch such as Paselli was found to be unsuitable for use as a cold hydrating viscosifying agent for preparation of final emulsions that are spreadable although it may be applied for spoonable products. Cook-up starches such as Colflo 67 are unsuitable as these will only provide structure after cooking for a considerable amount of time which is undesired in the process of preparing a final emulsion.

For the preparation of a spoonable final oil in water emulsion compositions comprising a combination of a cold swelling starch and a gum are preferred.

For the preparation of pourable final oil in water emulsions, compositions comprising a relatively low concentration of a gum such as xanthan gum are preferred.

In the compositions according to the invention, preferred gums are high molecular weight polysaccharides such as hydroxypropylmethylcellulose, guar and LBG.

The composition optionally comprises a fat blend. Although it is very well possible to require a consumer to add a fat or fat blend of his own choice to prepare the final oil in water emulsion, in many cases it is convenient if only a water based liquid needs to be added for the preparation of a final oil in water emulsion.

Therefore the composition according to the invention preferably comprises a fat blend.

Any fat or fat blend can be used as an ingredient of the present fat composition. Preferably, for products prepared at ambient temperature fats with higher melting temperatures i.e. above 40° C. are avoided because they may promote fat continuous final emulsions while to the contrary the final emulsion is desirably water continuous.

In view of ease of use for a consumer the fat or fat blend is preferably selected such that the composition is easily spoonable, squeezable or pourable. These product forms are easy to handle and enable accurate dosing. Pourability and squeezability can be defined by a Bostwick value. A method to determine this value is described in the examples. Pourable or squeezable emulsions preferably show a Bostwick value of at least 7 cm per 15 seconds at 15° C. According to another embodiment the composition has a more pasty character instead of being pourable. This consistency is comparable to the consistency of a chocolate paste or a honey.

Although pourable or squeezable compositions are preferred in view of their ease of dosing and manufacturing, a pourable composition comprising some fat sometimes shows sedimentation of ingredients like the emulsifier and the starch when these are present at relatively high levels. To prevent this, for these compositions the formation of a pasty composition is preferred. This is for example achieved by decreasing the amount of fat in the composition, which in turn increases the amounts of the other dry ingredients within the composition.

Suitable fats or fat blends are preferably selected from the group comprising sunflower oil, soybean oil, rapeseed oil, cottonseed oil, olive oil, corn oil, groundnut oil, or low melting butterfat fractions and/or combinations thereof. These fats may be partially hydrogenated or could be inter-esterified mixtures of hardened fats with liquid oils.

In the case of, in particular, pourable fat compositions hardened oils such as hardened rapeseed oil, are preferably excluded from the composition, when the final emulsion is made without the use of additional heat over that of the ambient temperature. It has however been found that the presence of hardened fats such as rapeseed oil is tolerable in amounts up to about 1 wt % hardened fat on weight of the total fat blend. Higher levels of hardened fats were found to lead to break up of the emulsion on shear or the absence of any of the desired emulsion structure formation.

The amount of fat or fat blend which is optionally present is from 0 to 100 parts by weight, preferably from 20 to 80 parts by weight, more preferably 30 to 70 parts by weight, even more preferred from 40 to 60 parts by weight. Even more preferred are fat levels of from about 60 to about 96 wt % fat.

Optionally the composition according to the invention comprises a protein. This protein may be a single protein or a combination of several types of protein. Preferably the protein is selected from the group comprising protein derived from milk or plant protein. Suitable proteins can for example be derived from milk and include skim milk powder, buttermilk powder, whey protein and caseinate or a combination thereof.

For the purpose of the invention the most preferred protein is caseinate which allows structuring below its isoelectric point. Whey proteins are also preferred for use but less so than caseinate. Whey protein can be added in the form of whey protein powder such as Lacprodan™ ex Danmark protein, concentrated whey protein powder, buttermilk powder and any other suitable form.

The amount of protein in the composition according to the invention is from 0 to 20 parts by weight, preferably from 0.1 to 5 parts by weight, more preferred from 0.3 to 3 parts by weight. Even more preferred the amount of protein is from 1 to 6 wt %, more preferred from 1.5 to 3 wt %.

The relative amounts of the ingredients of the composition according to the invention are dependent on the type of final oil in water emulsion that is desired and upon the mixing ratio with a water based liquid as is described below.

According to another preferred embodiment, the amount of protein and the amount of emulsifier in the composition according to the invention differ by at most 10%.

To further ensure that a final oil in water composition is spreadable and does not form into a thin, fluid sauce-like composition, the fat composition in case a cold swelling starch is used as the viscosifying agent, preferably comprises a low molecular weight viscosity imparting ingredient such as hydroxypropylmethylcellulose, especially low molecular weight hydroxypropylmethylcellulose e.g. E50™ ex Dow chemicals. The amount of this viscosity imparting ingredient is preferably from 1 to 5 parts by weight.

Salt may optionally be present in the composition.

Any salt which imparts a desirable taste or flavour to the final oil in water emulsion of the invention may be employed. Examples of preferred salts are sodium chloride and potassium chloride. The total presence of salts, when added, is preferably from 0.1 to 15 parts by weight. More preferred the amount of salt is from 0.5 to 8 wt %, more preferred from 1 to 3 wt % on total composition.

In the composition other ingredients can be present which improve the quality of the final oil in water emulsion which is prepared on the basis of this fat composition. For example taste or flavour improving ingredients such as spices, flavour concentrates vitamins, minerals, fibre, colourants, herbs, micronutrients and the like can be added.

Optionally preservatives like potassium sorbate or citric acid are added to the fat composition. This may be especially desired when the water content of the fat composition is above about 2 wt %. Furthermore preservatives in the fat composition can be added to improve the microbiological keepability of the final oil in water emulsion.

The composition can be prepared by any suitable process. In a preferred process the emulsifier, cold hydrating viscosifying agent and optionally a protein are added to the fat or fat blend in the form of dry powders under mixing. When these ingredients are mixed, the fat or fat blend is preferably at a temperature of from 20 to 35° C.

The composition can be used as such for shallow frying of food stuff. Due to the limited amounts of starch and other biopolymer, residue formation is minimized as much as possible.

The preferred presence of lecithin ensures improved spattering behaviour.

In a more preferred aspect of the invention the composition is used for the preparation of an oil in water emulsion having a fat content of from 20 to 80 wt %. As already mentioned above the composition of the present invention is exceptionally suitable for the preparation of an oil in water emulsion.

In an even more preferred embodiment, the composition is used for the instant preparation of a spreadable or spoonable product by admixing with an aqueous composition. Instant in this context means within a time frame of about 1 hour, more preferably within 5 minutes.

The final oil in water emulsion is prepared from the composition according to the invention and a water based liquid. This water based liquid essentially forms the aqueous phase of the final oil in water emulsion.

The water based liquid used to prepare the oil in water emulsion can be any liquid which comprises water as the continuous phase such as (fruit) juice, buttermilk, whey, milk, cream, and water. In addition to this the water based liquid may comprise ingredients such as water soluble flavour compositions, preservatives, colouring agents, herbs, powdered taste or flavour imparting substances and the like, citric acid, lactic acid.

According to a highly preferred embodiment, the composition which forms the basis of the final oil in water emulsion is mixed with water to form the final emulsion. The preferred fat containing composition for this embodiment comprises from 70 to 90 wt % fat, 6 to 25 wt % of a cold hydrating viscosifying ingredient, preferably a cold swelling starch, 0.5 to 15 wt % of an emulsifier, preferably lecithin, and 0.5 to 15 wt % of a dry milk ingredient.

According to another embodiment of the invention, the composition which forms the basis of the final oil in water emulsion is mixed with milk to form the final emulsion. The preferred fat containing composition for this embodiment comprises from 70 to 90 wt % fat, 6 to 25 wt % of a cold hydrating viscosifying ingredient, preferably a cold swelling starch, 0.5 to 15 wt % of an emulsifier, preferably lecithin.

The composition has been balanced such that the preparation of the final oil in water emulsion is easy and does not require any high power, factory type equipment like an ultraturrax or a votator. The final emulsion can be prepared by the use of a water based liquid which is at a temperature below the gelatinisation temperature of cook-up starches i.e. below about 60° C. Preferably the temperature of the water based liquid is at least the melting temperature of the fat blend used or higher. Moreover preferably ambient temperature or cold water or another water based liquid can be used for the preparation of the spreadable oil in water emulsion according to the current invention. Even a household mixer is not required and hence this composition is very suitable for quick, easy use for the preparation of a spread in an environment which lacks electricity supply and hot water supply.

It will be appreciated that the ratio wherein the composition and the water based liquid are mixed depends on the desired texture, rheology and ingredient composition such as fat level of the final oil in water emulsion. In the examples a series of different fat compositions and mixing ratio's with aqueous phase are illustrated.

In a preferred method for the preparation of an oil in water emulsion, the composition is mixed with a water based liquid in a volume ratio of from 1:3 to 3:1.

It has been found that for mixing ratio's of from 1:3 to 3:1 of the composition comprising fat, to water based liquid, the preferred fat composition comprises 60–96 wt % of a fat or fat blend, 1–6 wt % of protein, 2 to 25 wt % of a cold swelling starch, 1 to 6 wt % of an emulsifier, preferably lecithin,, and optionally 0 to 10 wt % water. Such compositions will lead to a final oil in water emulsions that is spreadable.

Furthermore it has been found that the physical stability of the final composition may be improved by increasing the level of lecithin and protein for a furthermore constant composition or by using milk instead of water as the water based liquid.

In addition to fat that may be present in the composition according to the invention, in the preparation of the final oil in water emulsion more fat or fat blend is optionally added. For example freshly prepared olive oil can be added to impart a nice olive oil flavour to the final product. The amount of fat or fat blend which is optionally added ranges from 20 to 80 wt % on final product.

The water based liquid and the composition according to the invention can be mixed in the desired ratio by any suitable method such as by stirring with a spoon or fork or by shaking. Mixing by shaking is preferred in view of the homogeneous mixing that results and because shaking in a closed vessel leads to considerable shear forces being exerted on the aqueous phase/fat composition mixture. Shaking is continued until a spoonable structure results.

Although this is certainly not required, the water based liquid and/or the fat composition may be heated before or during mixing to increase the speed of formation of a spreadable product.

In case very speedy emulsion formation is desired, it is recommended to add a small amount (preferably from 0.1 wt % to 1.0 wt % on total composition) of guar gum or an additional polymer with a rate of hydration greater than 3000 cP/minute in the RVA test eg Paselli PGF starch.

Optionally further ingredients like chocolate powder, coconut powder, honey, coffee powder, nut powder and powdered cheese concentrate can be added to the final oil in water emulsion or at an earlier stage when the aqueous phase and the composition according to the invention are mixed. This enables the consumer to make a range of products which differ in taste and in flavour but are all based on the composition according to the invention.

The invention also relates to the oil in water emulsions obtainable by the above process of mixing the composition according to the invention with a water based liquid.

Preferably the oil in water emulsion which is finally obtained is microbiologically and/or physically stable for at least 2 weeks at ambient temperature.

Furthermore this final oil in water emulsion preferably shows less than 10 vol % exudation of oil after storage at 30° C. for 3 days.

The average droplet diameter of the dispersed oil phase in the final oil in water emulsion is preferably less than 20 μm.

The hardness of the final product may be further improved by storage at a temperature of 4 to 15° C. for a time period of from 1 hour to 24 hours.

EXAMPLES

General
Determination of G'

Oscillatory shear measurements were performed using a Carrimed CSL500 Rheometer (parallel plate geometry) at a constant temperature of 5° C. (Stress of 10 Pa and Frequency of 1 Hz). The sample was loaded onto the rheometer immediately after mixing and values of G' were collected every 30 seconds. The value of G' quoted in Pa is that recorded at a time of 15 minutes after initial shaking.

Stevens value was determined in g by using a Stevens texture analyser (2 mm/sec, 20 mm depth, mayonnaise grid (mesh 7, thread thickness 0.8 mm, mesh width 2.83 mm, see FIG. 1).

RVA-method to determine suitable cold hydrating viscosifying agents.
Rapid Visco-Analyser (RVA)-Biopolymer Hydration Test A model emulsion was prepared containing:

| | |
|---|---|
| Sunflower Oil | 12.5 g |
| Lecithin (Bolec MT) | 2.5 g |
| "test agent" | 4.0 g in case of starch, 1 g in case of a gum. |

These ingredients were mixed for 1 minute, at 25° C., then water 11.25 g (equivalent to 45 Parts in 100 g formulation) was added.

This mixture was put straight into RVA machine (manufactured by Newport Scientific Pty Ltd) and mixed for 10 mins at 25° C., 180 rpm.

From these data, final viscosity and rate of viscosity development (ie. the maximum gradient between the offset of viscosity increase and the plateau of final viscosity) were derived.

Small Deformation Rheology of Instant Spreads

Product was placed on rheometer with parallel plate geometry in oscillation mode, 1 mm gap, 4 cm diameter.

The experiment consisted of a stress sweep from 1 up to ~1000 Pa. The parameters are as follows: frequency 1 Hz, temperature 20° C.

From the plot of tan delta vs strain, the value of strain where tan delta=1 is plotted against the initial tan delta value.

EXAMPLE 1–8

A fat composition was prepared by mixing lecithin in sunflower oil at room temperature, followed by the addition of the other ingredients, like the starch, and shaking this mixture in a sealed container to disperse the powders in the oil.

In example 9,10 no fat was used and therefore, the starch and the other ingredients were mixed into the liquid lecithin at room temperature to produce a granular, crumb-like composition.

The ingredient composition for examples 1–8 is shown in table 1.

TABLE 1 ingredient composition in wt % for example 1–7

| Ingredient | 1 | 2 | 3 | 4 | 5 | 6 | 7 |
|---|---|---|---|---|---|---|---|
| Sunflower oil | 86.3 | 63.6 | 75.2 | 81.4 | 65.4 | 92.6 | 89.8 |
| Sodium caseinate | 1.7 | 5.1 | 3.5 | 2.4 | 4.4 | 0.8 | 1.2 |
| Ultratex 4 ™ ex national starch | 6.9 | 20.3 | 14.0 | 9.8 | 17.4 | 3.2 | 4.8 |
| Lecithin (Bolec MT ™ ex Unimills Zwijndrecht) | 1.7 | 1.3 | 1.5 | 1.6 | 4.4 | 1.9 | 1.8 |
| NaCl | 2.1 | 6.1 | 4.2 | 2.9 | 5.2 | 1.0 | 1.4 |
| buffer | 1.1 | 3.3 | 1.2 | 1.6 | 2.8 | 0.5 | 0.8 |
| Potassium sorbate | 0.2 | 0.3 | 0.3 | 0.2 | 0.4 | 0.1 | 0.1 |

The fat containing compositions obtained were pourable at ambient temperature.

Example 8: same as example 1 except that Ultratex 4 was replaced by Ultratex 2.

Ultratex™ was subjected to the RVA method. Final viscosity: about 2380 cP. Rate of viscosity development: 1867 cP/minute.

Ultratex 2: was subjected to the RVA method. Final viscosity: about 2432 cP. Rate of viscosity development: 1410 cP/minute.

The compositions of table 1 were mixed with milk which contained 4 wt % milk fat in the ratios given below. Mixing was carried out at room temperature and by shaking in a closed container.

In example 1, the pourable product was mixed with milk in a 1 to 1 weight ratio under shaking.

In example 2: mixed with milk in weight ratio of 72 wt % of milk and 28 wt % of the composition.

In example 3: mixed with milk in weight ratio of 64 wt % of milk and 36 wt % of the composition.

In example 4: mixed with milk in weight ratio of 55 wt % of milk and 45 wt % of the composition.

In example 5: mixed with milk in weight ratio of 46 wt % of milk and 22 wt % of the composition and 32% of an sunflower oil.

In example 6: mixed with milk in weight ratio of 27 wt % of milk and 73 wt % of the composition.

In example 7: mixed with milk in weight ratio of 37 wt % of milk and 63 wt % of the composition.

For all examples shaking commenced as soon as the water based liquid was added. During shaking, after about 1 minute, the product became very viscous and finally a spreadable oil in water emulsion with Stevens value as indicated in table 2 resulted.

These products were spreadable as desired and showed good taste and melting behaviour. The pH of all products was about 4.9.

TABLE 2

| rheology of final oil in water emulsions | | | | | | | | |
|---|---|---|---|---|---|---|---|---|
| | 1 | 2 | 3 | 4 | 5 | 6 | 7 | 8 |
| Stevens at 20° C. (g) | 207 | 157 | 227 | 184 | 293 | nd | nd | 174 |
| G' (Pa) | 2275 | 1227 | 990 | 1380 | 1510 | nd | nd | nd |

Nd: not determined.

EXAMPLE 9, 10

TABLE 3

| ingredient composition in wt % for example 9, 10 | | |
|---|---|---|
| Ingredient | 9 | 10 |
| Sodium caseinate | 12.6 | 11.8 |
| Ultratex ex national starch | 50.3 | 47.0 |
| Lecithin (Bolec MT ex Unimills Zwijndrecht) | 12.6 | 17.7 |
| NaCl | 15.1 | 14.2 |
| buffer | 8.2 | 7.7 |
| Potassium sorbate | 1.2 | 1.5 |

In example 9: mixed with milk in weight ratio of 46% of milk, 7.4% of the composition and 46% of sunflower oil.

In example 10: mixed with milk in weight ratio of 37.5 wt % of milk, 6.3% of the composition and 63 wt % of sunflower oil.

The compositions of example 9, 10 after mixing with milk, resulted in a spreadable final oil in water emulsion.

EXAMPLES 11, 12, 13, 14

Compositions were prepared according to table 4 following the procedure of example 1–8.

TABLE 4

| (amounts in wt %) | | | | |
|---|---|---|---|---|
| Ingredient | 11 | 12 | 13 | 14 |
| Refined bean oil | 86.63 | 84.45 | 88.20 | 91.810 |
| Bolec MT ™ (Unimills, UMC Zwijndrecht) | 1.740 | — | 1.760 | 1.836 |
| B-Carotene | 0.095 | — | — | — |
| Ultratex 4 ™ | 4.630 | 8.450 | 4.410 | — |
| Na-Caseinate | 1.740 | — | 1.760 | 1.836 |
| NaCl | 2.080 | 2.020 | 2.110 | 2.203 |
| Tri-Na-citrate-di-hydrate (ground) | 0.510 | 0.500 | 0.530 | 0.551 |
| Citric acid mono-hydrate | 0.190 | 0.185 | 0.200 | 0.367 |
| K-sorbate (ground) | 0.170 | 0.169 | 0.175 | 0.331 |
| Guar | 2.300 | 3.370 | — | 1.377 |
| Tween 20 | — | 0.850 | — | — |
| Xanthan | — | — | 0.883 | — |

The compositions thus obtained were mixed with water at ambient temperature as follows:

In example 11: mixed with water in weight ratio of 51.2% of the composition and 48.8% of water.

In example 12: mixed with water in weight ratio of 51.8 wt % of the composition and 48.2 wt % of water.

In example 13: mixed with water in weight ratio of 50.8 wt % of the composition and 49.2 wt % of water.

Charateristics of cold hydrating viscosifying agents:

Example 11: Ultratex4/Guar (2.7;1.3)
Tan d=0.17
Critical Strain (ie where tan d=1)=1.35
Example 12 Tween/Guar 27
Tan d=0.17
Critical Strain (ie where tan d=1)=1.21

The resulting compositions showed spreadable textures with Stevens Values at 20° C. of 150 g for example 11, 117g for example 12 and 130 g for example 13.

In example 14 the obtained mixture was mixed with water in weight ratio of 54.8 wt % of the composition and 45.2 wt % of water. The resulting composition showed a pourable texture (Stevens not measurable on pourable composition).

What is claimed is:

1. Pourable or pasty essentially water free composition comprising 0–100 parts by weight of a fat or fat blend, 0.01 to 25 parts by weight of an emulsifier, 0.5 to 50 parts by weight of a cold hydrating viscosifying agent selected from the group consisting of cold swelling starch, inulin and gums which give final viscosities greater than 400 cP with hydration rates greater than 1500 cP/min and combinations thereof.

2. Composition according to claim 1 wherein the emulsifier is a lecithin.

3. Composition according to claim 1, comprising 20 to 80 parts by weight of a fat or a fat blend.

4. Composition according to claim 1 which additionally comprises a salt.

5. Composition according to claim 1 wherein the cold hydrating viscosifying agent is a cold swelling starch and which composition additionally comprises a low molecular weight viscosity imparting ingredient.

6. Composition according to claim 5 wherein the lower molecular weight viscosity imparting ingredient is hydroxypropylmethylcellulose.

7. Process for preparing an oil in water emulsion comprising mixing a water based liquid and a fat composition according to claim 1 in a weight ratio of from 1:3 to 3:1.

8. Process according to claim 7 wherein the liquid is selected from the group comprising water, milk, whey, buttermilk, cream, juice.

9. Spreadable emulsion obtainable by the process of claim 7.

* * * * *